(12) United States Patent
Omoigui

(10) Patent No.: US 7,305,384 B2
(45) Date of Patent: Dec. 4, 2007

(54) LIVE PRESENTATION SEARCHING

(75) Inventor: Nosakhare D. Omoigui, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 596 days.

(21) Appl. No.: 11/000,103

(22) Filed: Nov. 30, 2004

(65) Prior Publication Data
US 2005/0080847 A1    Apr. 14, 2005

Related U.S. Application Data

(63) Continuation of application No. 09/465,547, filed on Dec. 16, 1999, now Pat. No. 6,928,655.

(51) Int. Cl.
*G06F 7/00* (2006.01)
*G06F 17/30* (2006.01)

(52) U.S. Cl. .................. 707/3; 707/10; 707/104.1; 709/203; 709/231; 725/105; 725/116; 725/146

(58) Field of Classification Search .............. 707/3, 707/10, 104.1; 725/105, 116, 146; 709/203, 709/231
See application file for complete search history.

(56) References Cited

U.S. PATENT DOCUMENTS

| | | |
|---|---|---|
| 4,931,950 A | 6/1990 | Isle et al. |
| 5,050,161 A | 9/1991 | Golestani |
| 5,119,474 A | 6/1992 | Beitel et al. |
| 5,133,075 A | 7/1992 | Risch |
| 5,274,758 A | 12/1993 | Beitel et al. |
| 5,309,562 A | 5/1994 | Li |
| 5,313,454 A | 5/1994 | Bustin et al. |
| 5,341,474 A | 8/1994 | Gelman et al. |
| 5,414,455 A | 5/1995 | Hooper et al. |
| 5,434,848 A | 7/1995 | Chimento, Jr. et al. |
| 5,455,910 A | 10/1995 | Johnson et al. |
| 5,481,542 A | 1/1996 | Logston et al. |
| 5,490,252 A | 2/1996 | Macera et al. |
| 5,504,744 A | 4/1996 | Adams et al. |
| 5,519,701 A | 5/1996 | Colmant et al. |
| 5,521,630 A | 5/1996 | Chen et al. |
| 5,533,021 A | 7/1996 | Branstad et al. |
| 5,537,408 A | 7/1996 | Branstad et al. |

(Continued)

FOREIGN PATENT DOCUMENTS

EP    0605115    7/1994

(Continued)

OTHER PUBLICATIONS

ET-OH Horyuki, "RealNetwork Intel RealPresentr G2," Internet Watch Dec. 7, 1999, one page.

(Continued)

*Primary Examiner*—Vincent F. Boccio
(74) *Attorney, Agent, or Firm*—Lee & Hayes, PLLC

(57) ABSTRACT

In a networked client/server system, live presentations can be streamed from an encoder or other server to a client computer. Additionally, information describing the presentation is registered with a search server. This information is made available for user searches only for as long as the information properly describes the live presentation. When the information no longer describes a current live presentation, the information is no longer available for searching.

41 Claims, 6 Drawing Sheets

U.S. PATENT DOCUMENTS

| | | |
|---|---|---|
| 5,541,955 A | 7/1996 | Jacobsmeyer |
| 5,559,942 A | 9/1996 | Gough et al. |
| 5,566,175 A | 10/1996 | Davis |
| 5,574,724 A | 11/1996 | Bales et al. |
| 5,614,940 A | 3/1997 | Cobbley et al. |
| 5,617,423 A | 4/1997 | Li et al. |
| 5,623,690 A | 4/1997 | Palmer et al. |
| 5,625,405 A | 4/1997 | DuLac et al. |
| 5,640,320 A | 6/1997 | Jackson et al. |
| 5,664,227 A | 9/1997 | Mauldin et al. |
| 5,692,213 A | 11/1997 | Goldberg et al. |
| 5,717,691 A | 2/1998 | Dighe et al. |
| 5,717,869 A | 2/1998 | Moran et al. |
| 5,719,786 A | 2/1998 | Nelson et al. |
| 5,721,829 A | 2/1998 | Dunn et al. |
| 5,742,347 A | 4/1998 | Kandlur et al. |
| 5,768,533 A | 6/1998 | Ran |
| 5,786,814 A | 7/1998 | Moran et al. |
| 5,794,210 A | 8/1998 | Goldhaber et al. |
| 5,794,249 A | 8/1998 | Orsolini et al. |
| 5,799,292 A | 8/1998 | Hekmatpour |
| 5,801,685 A | 9/1998 | Miller et al. |
| 5,808,662 A | 9/1998 | Kinney et al. |
| 5,818,510 A | 10/1998 | Cobbley et al. |
| 5,822,537 A | 10/1998 | Katseff et al. |
| 5,828,848 A | 10/1998 | MacCormack et al. |
| 5,835,495 A | 11/1998 | Ferriere |
| 5,835,667 A | 11/1998 | Wactlar et al. |
| 5,838,906 A | 11/1998 | Doyle et al. |
| 5,859,641 A | 1/1999 | Cave |
| 5,864,682 A | 1/1999 | Porter et al. |
| 5,870,755 A | 2/1999 | Stevens et al. |
| 5,873,735 A | 2/1999 | Yamada et al. |
| 5,892,506 A | 4/1999 | Hermanson |
| 5,894,480 A | 4/1999 | Hoffert et al. |
| 5,903,673 A | 5/1999 | Wang et al. |
| 5,918,002 A | 6/1999 | Klemets et al. |
| 5,930,473 A | 7/1999 | Teng et al. |
| 5,930,787 A | 7/1999 | Minakuchi et al. |
| 5,933,603 A | 8/1999 | Vahalia et al. |
| 5,953,506 A | 9/1999 | Kalra et al. |
| 5,956,716 A | 9/1999 | Kenner et al. |
| 5,995,941 A | 11/1999 | Maquire et al. |
| 5,996,015 A | 11/1999 | Day et al. |
| 5,999,979 A | 12/1999 | Vellanki et al. |
| 6,006,241 A | 12/1999 | Purnaveja et al. |
| 6,014,706 A | 1/2000 | Cannon et al. |
| 6,023,731 A | 2/2000 | Chawla |
| 6,032,130 A | 2/2000 | Alloul et al. |
| 6,035,341 A | 3/2000 | Nunally et al. |
| 6,041,345 A | 3/2000 | Levi et al. |
| 6,049,823 A | 4/2000 | Hwang |
| 6,064,794 A | 5/2000 | McLaren et al. |
| 6,111,882 A | 8/2000 | Yamamoto |
| 6,115,035 A | 9/2000 | Compton et al. |
| 6,118,450 A | 9/2000 | Proehl et al. |
| 6,118,817 A | 9/2000 | Wang |
| 6,128,653 A | 10/2000 | del Val et al. |
| 6,133,920 A | 10/2000 | deCarmo et al. |
| 6,144,375 A | 11/2000 | Jain et al. |
| 6,144,991 A | 11/2000 | England |
| 6,148,304 A | 11/2000 | de Vries et al. |
| 6,154,771 A | 11/2000 | Rangan et al. |
| 6,161,149 A | 12/2000 | Achacoso et al. |
| 6,166,314 A | 12/2000 | Weinstock et al. |
| 6,173,317 B1 | 1/2001 | Chaddha et al. |
| 6,173,329 B1 | 1/2001 | Sasaki et al. |
| 6,184,878 B1 | 2/2001 | Alonso et al. |
| 6,184,996 B1 | 2/2001 | Gase |
| 6,201,536 B1 | 3/2001 | Hendricks et al. |
| 6,204,840 B1 | 3/2001 | Petelycky et al. |
| 6,215,910 B1 | 4/2001 | Chaddha |
| 6,230,172 B1 | 5/2001 | Purnaveja et al. |
| 6,230,205 B1 | 5/2001 | Garrity et al. |
| 6,233,389 B1 | 5/2001 | Barton et al. |
| 6,263,371 B1 | 7/2001 | Geagan, III et al. |
| 6,279,040 B1 | 8/2001 | Ma et al. |
| 6,314,466 B1 | 11/2001 | Agarwal et al. |
| 6,317,777 B1 | 11/2001 | Skarbo et al. |
| 6,366,914 B1 | 4/2002 | Stern |
| 6,397,275 B1 | 5/2002 | Clapp et al. |
| 6,418,557 B1 | 7/2002 | Otani |
| 6,463,462 B1 | 10/2002 | Smith et al. |
| 6,493,671 B1 | 12/2002 | Ladd et al. |
| 6,594,682 B2 | 7/2003 | Peterson et al. |
| 6,928,655 B1 * | 8/2005 | Omoigui .................... 725/105 |
| 2001/0003828 A1 | 6/2001 | Peterson et al. |
| 2001/0039568 A1 | 11/2001 | Murray et al. |
| 2003/0050784 A1 | 3/2003 | Hoffberg et al. |

FOREIGN PATENT DOCUMENTS

| | | |
|---|---|---|
| EP | 0653884 | 5/1995 |
| EP | 0669587 A2 | 8/1995 |
| EP | 0676898 | 10/1995 |
| EP | 0746158 | 12/1996 |
| EP | 0812112 A2 | 12/1997 |
| WO | WO 94/01964 | 1/1994 |
| WO | WO 98/37698 | 8/1998 |
| WO | WO 0073914 A1 | 12/2000 |

OTHER PUBLICATIONS

Intel Architecture Labs, "Intel Internet Presentation Software," 1999, pp. 1-5.

Intel Corporation *Research and Development;* "Intel Internet Presentation Software," 1999, one page.

* cited by examiner

| Content Database 112 | | Characteristics 236 | | |
|---|---|---|---|---|
| Title 230 | Source 232 | Duration 234 | | Descriptive Information 238 |
| Internet Training | W | 2:00 p.m. - 4:00 p.m. | Accessing Internet | Internet, Training, Network, Web, Authoring |
| College Football Summary | X | 30 minutes | University of Michigan | College, Football, NCAA |
| Microsoft Press Conference | W, Y | | Presenter - Bill Gates | Microsoft, Press Release, Bill Gates |
| News | Z | | Sports | News, National |

Fig. 4

LIVE PRESENTATION SEARCHING

RELATED APPLICATIONS

This application is a continuation of U.S. patent application Ser. No. 09/465,547, filed on Dec. 16, 1999 now U.S. Pat. No. 6,928,655, entitled "Live Presentation Searching" and naming Nosakhare D. Omoigui as inventor, the disclosure of which is hereby incorporated herein by reference. This application is also related to a divisional of the above-noted application, filed Jul. 7, 2004, U.S. application Ser. No. 10/886,809, and is related to a continuation of the first above-noted application, filed on an even date herewith, U.S. patent application Ser. No. (unknown at time of filing).

TECHNICAL FIELD

This invention relates to networked client/server systems and to methods of delivering and rendering live content in such systems. More particularly, the invention relates to searching for live presentations.

BACKGROUND OF THE INVENTION

The advent of computers and their continued technological advancement has revolutionized the manner in which people work and live. Information that used to be available only in written or verbal form is becoming increasingly available in electronic form. Furthermore, presentations which used to be available only on particular recording media (e.g., film or tape) or via television broadcasts are now available in digital form (e.g., over the Internet).

One problem encountered by users when faced with this continually increasing mass of digital information is the ability to locate particular information that the user is interested in. For example, trying to locate a particular presentation can be difficult and cumbersome for users. Various search mechanisms exist for pre-recorded "on-demand" presentations (e.g., various world wide web search engines). On-demand presentations are fairly easily searchable because the underlying data of the presentation is already known. However, in the case of live presentations, such underlying data is not known because, as the presentation is live, the underlying data is not available yet.

Some systems do exist that allow a user to identify scheduled live presentations. For example, a television programming guide may be available over the Internet that allows a user to search for television programs that are scheduled to be broadcast (e.g., via cable, satellite system, or typical television broadcast frequencies, such as UHF or VHF) and their associated broadcast times. However, such programming guides typically do not provide the flexibility to allow non-scheduled programs to be identified to the user. Furthermore, such programming guides are typically limited to television broadcasts and do not allow users to identify presentations from any of the wide variety of alternate sources (such as via the Internet).

The invention described below addresses these disadvantages, providing a way to search for live presentations.

SUMMARY OF THE INVENTION

In a networked client/server system, live presentations can be streamed from an encoder or other server to a client computer. Additionally, information describing the presentation is registered with a search server. This information is made available for user searches only for as long as the information properly describes the live presentation. When the information no longer describes a current live presentation, the information is no longer available for searching.

According to one aspect of the invention, the information describes the entire presentation. The information is available in the search server for user searches for the duration of the presentation. Once the presentation is over, the information is deleted from the search server, preventing any subsequent user search requests from being satisfied using the information describing that presentation.

According to another aspect of the invention, the information describes a particular characteristic(s) of the presentation (e.g., the current topic). The information for a characteristic is available in the search server for user searches for as long as that characteristic describes the portion of the presentation currently being presented. Once that characteristic no longer describes the portion currently being presented, the information describing that characteristic is deleted from the search server, preventing any subsequent user search requests from being satisfied using the information describing that characteristic.

According to another aspect of the invention, a user can register a notification request with the search server. The notification request identifies a set of search criteria as well as a manner in which the user should be notified in the event a live presentation matches the search criteria. The search server continues to compare new information regarding available live presentations to the search criteria. If a match is found, the search server notifies the user in whatever manner the user requested.

BRIEF DESCRIPTION OF THE DRAWINGS

FIG. 4 illustrates entries of an exemplary content database in more detail.

DETAILED DESCRIPTION

General Network Structure

Figure 1:
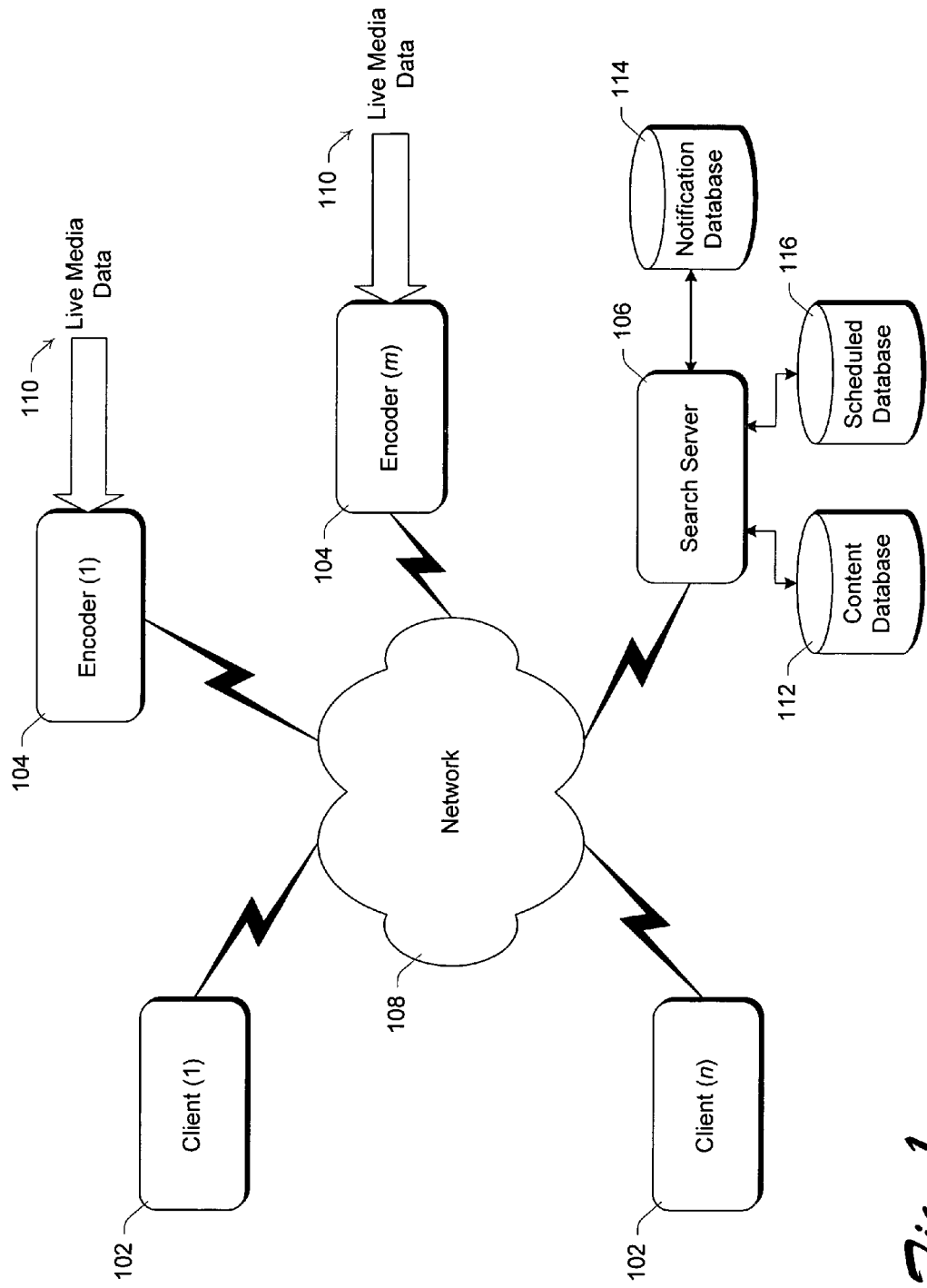
FIG. 1 shows a client/server network system and environment in accordance with one embodiment of the invention.

FIG. 1 shows a client/server network system and environment in accordance with one embodiment of the invention. Generally, the system includes multiple (n) network client computers 102, multiple (m) encoders 104, and a search server 106. The computers 102, encoders 104, and server 106 communicate with each other over a data communications network. The communications network in FIG. 1 is a public network 108, such as the Internet. The data communications network might also include local-area networks and/or private wide-area networks, and can include both wired and wireless sections. Client computers 102, encoders 104, and server 106 can communicate with one another via any of a wide variety of known protocols, such as the Hypertext Transfer Protocol (HTTP).

Encoders 104 receive live content or presentations in the form of different media streams 110. Encoders 104 can be dedicated media servers, or alternatively other more general-purpose computer systems. These media streams 110 can be individual media streams (e.g., audio, video, graphical, etc.), or alternatively can be composite media streams including two or more of such individual streams. The media streams 110 are provided to encoders on a "live" basis from other data source components through dedicated communications channels or through the Internet itself. Encoders 104 coordinate the streaming of the live content to other components on the network 108 that request the content, such as client computers 102. It is to be appreciated that although the media streams are referred to as being "live", there may be a delay (e.g., between one second and thirty seconds) between the time of the actual event and the time the media streams reach the encoder(s).

There are various standards for streaming media content and composite media streams. "Advanced Streaming Format" (ASF) is an example of such a standard, including both accepted versions of the standard and proposed standards for future adoption. ASF specifies the way in which multimedia content is stored, streamed, and presented by the tools, servers, and clients of various multimedia vendors. ASF provides benefits such as local and network playback, extensible media types, component download, scalable media types, prioritization of streams, multiple language support, environment independence, rich inter-stream relationships, and expandability. Further details about ASF are available from Microsoft Corporation of Redmond, Wash.

Encoders 104 can transmit any type of presentation over the network 108. Examples of such presentations include audio/video presentations (e.g., television broadcasts or presentations from a "NetShow™" server (available from Microsoft Corp. of Redmond, Wash.)), video-only presentations, audio-only presentations, graphical or animated presentations, etc.

Search server 106 maintains a content database 112, a notification database 114, and a scheduled presentations database 116. In content database 112, server 106 maintains descriptive information regarding the current live content available from encoders 104. A user of a client computer 102 can access search server 106 to search for particular live content. In notification database 114, server 106 maintains information regarding users of client computers 102 that have registered to be notified when particular live content is available. In scheduled presentations database 116, server 106 maintains information regarding future live presentations that have been registered with server 106.

Exemplary Computer Environment

In the discussion below, the invention will be described in the general context of computer-executable instructions, such as program modules, being executed by one or more conventional personal computers. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. In a distributed computer environment, program modules may be located in both local and remote memory storage devices.

Alternatively, the invention could be implemented in hardware or a combination of hardware, software, and/or firmware. For example, the invention could be implemented in one or more application specific integrated circuits (ASICs).

Figure 2:
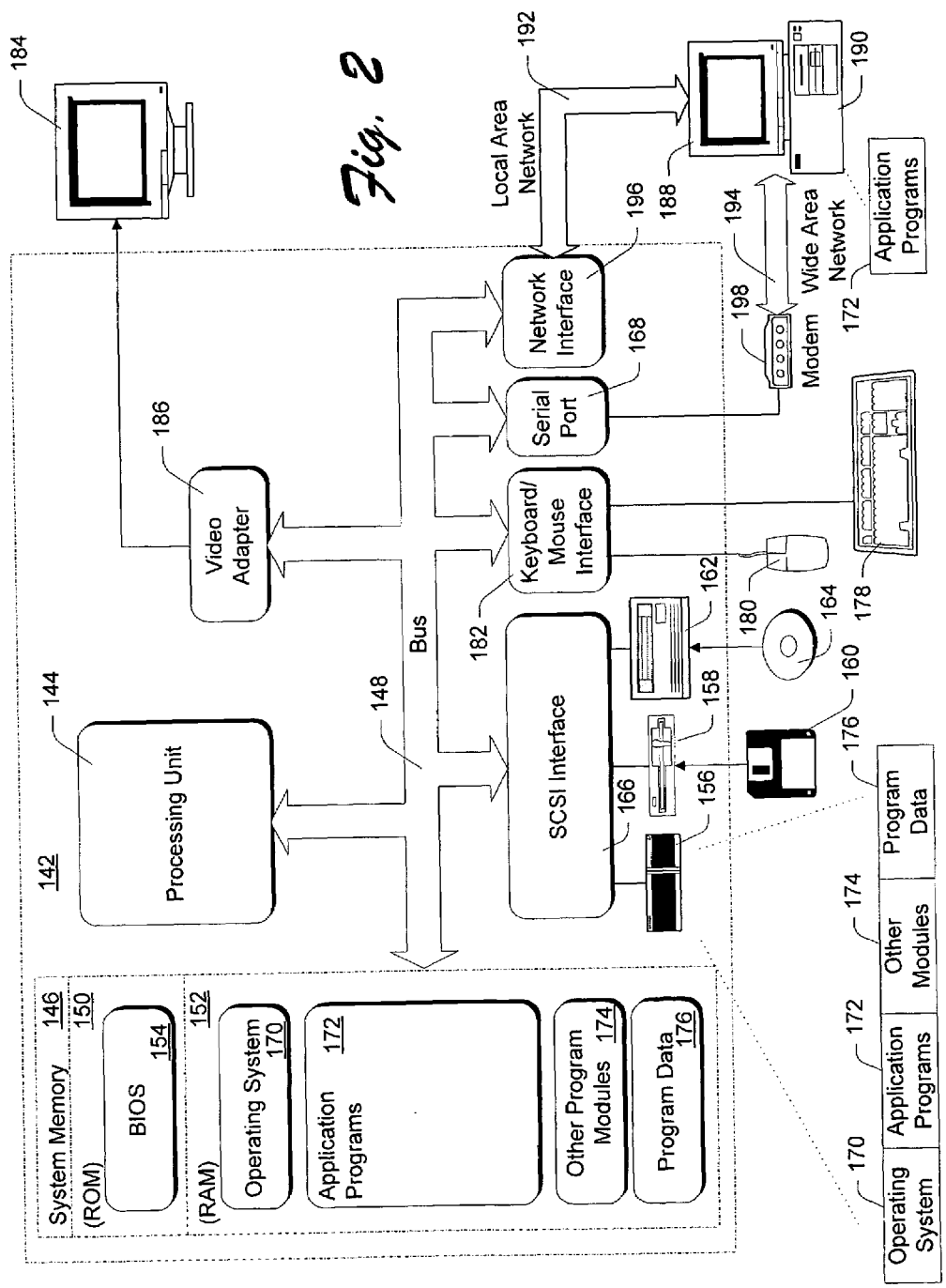
FIG. 2 shows a general example of a computer that can be used in accordance with the invention.

FIG. 2 shows a general example of a computer 142 that can be used in accordance with the invention. Computer 142 is shown as an example of a computer that can perform the functions of any of client computers 102, server encoders 104, or server 106 of FIG. 1.

Computer 142 includes one or more processors or processing units 144, a system memory 124, and a system bus 148 that couples various system components including the system memory 124 to processors 144.

The bus 148 represents one or more of any of several types of bus structures, including a memory bus or memory controller, a peripheral bus, an accelerated graphics port, and a processor or local bus using any of a variety of bus architectures. The system memory includes read only memory (ROM) 150 and random access memory (RAM) 152. A basic input/output system (BIOS) 154, containing the basic routines that help to transfer information between elements within computer 142, such as during start-up, is stored in ROM 150. Computer 142 further includes a hard disk drive 156 for reading from and writing to a hard disk, not shown, a magnetic disk drive 158 for reading from and writing to a removable magnetic disk 160, and an optical disk drive 162 for reading from or writing to a removable optical disk 164 such as a CD ROM or other optical media. The hard disk drive 156, magnetic disk drive 158, and optical disk drive 162 are connected to the system bus 148 by an SCSI interface 166 or some other appropriate interface. The drives and their associated computer-readable media provide nonvolatile storage of computer readable instructions, data structures, program modules and other data for computer 142. Although the exemplary environment described herein employs a hard disk, a removable magnetic disk 160 and a removable optical disk 164, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk, magnetic disk 160, optical disk 164, ROM 150, or RAM 152, including an operating system 170, one or more application programs 172, other program modules 174, and program data 176. A user may enter commands and information into computer 142 through input devices such as keyboard 178 and pointing device 180. Other input devices (not shown) may include a microphone, joystick, game pad, satellite dish, scanner, or the like. These and other input devices are connected to the processing unit 144 through an interface 182 that is coupled to the system bus. A monitor 184 or other type of display device is also connected to the system bus 148 via an interface, such as a video adapter 186. In addition to the monitor, personal computers typically include other peripheral output devices (not shown) such as speakers and printers.

Computer 142 operates in a networked environment using logical connections to one or more remote computers, such as a remote computer 188. The remote computer 188 may be another personal computer, a server, a router, a network PC, a peer device or other common network node, and typically includes many or all of the elements described above relative to computer 142, although only a memory storage device 190 has been illustrated in FIG. 2. The logical connections depicted in FIG. 2 include a local area network (LAN) 192 and a wide area network (WAN) 194. Such networking environments are commonplace in offices, enterprise-wide computer networks, intranets, and the Internet. In the described embodiment of the invention, remote computer 188 executes an Internet Web browser program such as the "Internet Explorer" Web browser manufactured and distributed by Microsoft Corporation of Redmond, Wash.

When used in a LAN networking environment, computer 142 is connected to the local network 192 through a network interface or adapter 196. When used in a WAN networking environment, computer 142 typically includes a modem 198 or other means for establishing communications over the wide area network 194, such as the Internet. The modem 198, which may be internal or external, is connected to the system bus 148 via a serial port interface 168. In a networked environment, program modules depicted relative to the personal computer 142, or portions thereof, may be stored in the remote memory storage device. It will be appreciated that the network connections shown are exemplary and other means of establishing a communications link between the computers may be used.

Generally, the data processors of computer 142 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below. Furthermore, certain sub-components of the computer may be programmed to perform the functions and steps described below. The invention includes such sub-components when they are programmed as described. In addition, the invention described herein includes data structures, described below, as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

Search Server

Figure 3:
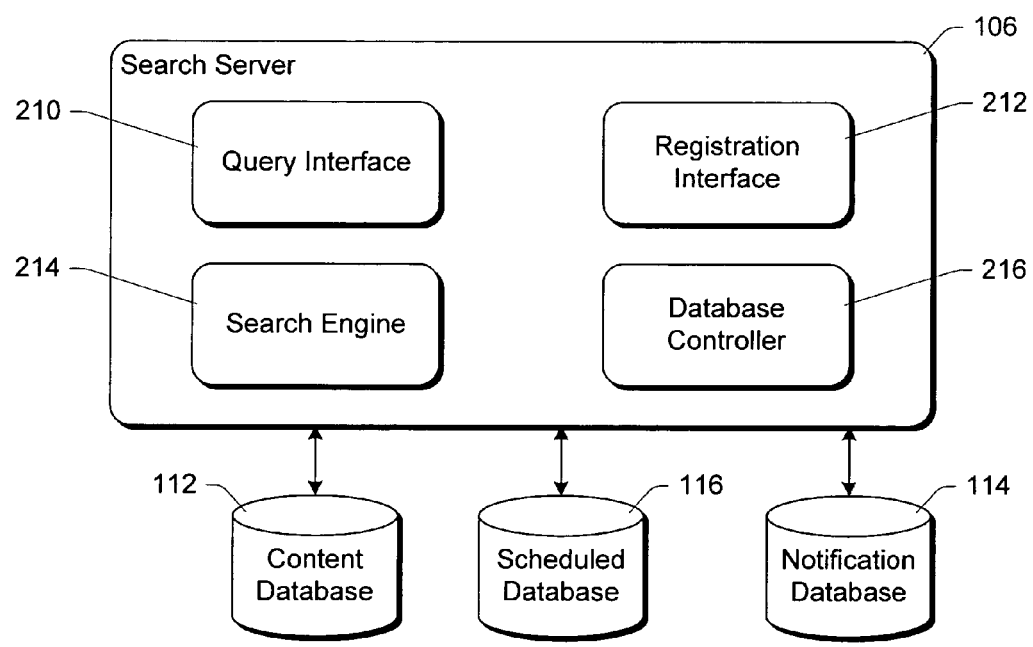
FIG. 3 illustrates an exemplary search server in more detail.

FIG. 3 illustrates an exemplary search server in more detail. Search server 106 includes a query interface 210, a registration interface 212, a search engine 214, and a database controller 216. Client computers 102 (FIG. 1) communicate with search server 106 via query interface 210. Query interface 210 allows users of client computers 102 to enter search criteria for live content. Upon receipt of a search request via query interface 210, search engine 214 accesses content database 112 to search for live content that matches the search criteria.

Encoders 104 (FIG. 1) communicate with search server 106 via registration interface 212. Registration interface 212 allows encoders 104 to provide descriptive information regarding the live content that they can stream to client computers. This descriptive information can then be added to content database 112 and used for searches by search engine 214. Descriptive information can be maintained by server 106 for any live content that can be provided by encoders 104.

Database controller 216 manages the databases 112, 114, and 116. This management includes both adding entries to and removing entries from databases 112, 114, and 116.

Live content or presentations available from encoders 104 can be either pre-scheduled or non-scheduled. Pre-scheduled presentations refer to presentations that have been registered with search server 106 as occurring in the future (e.g., not already in progress and not starting within the next five minutes). Descriptive information regarding pre-scheduled presentations (e.g., presentation title, key words describing the content of the presentation, and encoder(s) from which the presentation will be available) can be provided to server 106 from one of the encoders 104 or some other source, either via the network 108 (FIG. 1) or alternatively some other delivery mechanism (e.g., a magnetic or optical disk).

Non-scheduled presentations refer to presentations that have not been registered with search server 106 as occurring in the future. A non-scheduled presentation is registered with server 106 as the presentation is about to begin (e.g., within the next five minutes) or shortly after it has begun. The presentation can be registered by an encoder 104 (e.g., the encoder 104 that will be streaming the live content), or alternatively some other source. As part of the registration process, server 106 is provided with descriptive information regarding the presentation.

FIG. 4 illustrates entries of an exemplary content database in more detail. FIG. 4 is described with additional reference to components in FIG. 3. Each entry in content database 112 includes data for one or more of the following fields: title 230, source 232, duration 234, current characteristic(s) 236, and descriptive information 238. Content database 112 can be stored in volatile memory (e.g., RAM), non-volatile memory (e.g., a magnetic disk drive), or a combination thereof.

Title field 230 includes a descriptive title of the presentation. Source field 232 identifies the encoder(s) 104 from which the presentation can be obtained. Duration field 234 identifies, for some entries, the duration of the presentation; in other entries, the duration data is not included. Characteristics field 236 optionally identifies the current characteristics for the presentation (i.e., one or more characteristics describing the portion of the presentation currently being presented or about to be presented). Any of a wide variety of characteristics can be included for the presentation, such as the current topic (as illustrated in FIG. 4), the name of the current speaker, the gender of the current speaker, the color of the current speaker's clothing, etc. Descriptive information field 238 provides various descriptive information that describes the content of the presentation.

Content database 112 maintains information identifying each of the currently available live presentations that is registered with server 106. Information regarding pre-scheduled presentations that are not currently available (or shortly will be available) from an encoder 104 is maintained in scheduled database 116. Alternatively, such information could be included in content database 112 and simply marked as "invalid" until the presentation is available from an encoder 104.

In the illustrated example, each current live presentation has an associated entry in database 112. When a pre-scheduled presentation is about to begin (e.g., it is scheduled to begin shortly, such as within two minutes), database controller 216 (FIG. 3) loads descriptive information corresponding to the presentation into an entry of database 112.

In the case of pre-scheduled presentations, this descriptive information is loaded from pre-scheduled presentations database 116. In the case of non-scheduled presentations, this descriptive information is received directly from registration interface 212.

When a presentation is over, the entry in database 112 corresponding to the presentation is deleted. Server 106 is provided with an indication of the duration of a live presentation from the encoder or other device that registered the presentation with server 106. In one implementation, this indication of the duration is a time period or "run time" for the presentation. For example, an encoder may indicate that a particular live presentation is going to be available between 2:00 p.m. and 4:00 p.m. on Jan. 1, 2000, or that a particular live presentation is going to last for 45 minutes. Database controller 216 monitors content database 112 for presentations whose time period or "run time" has passed, and deletes the corresponding entries from database 112. According to another implementation, this indication of the duration of the presentation is simply a "presentation over" message or similar indicator. For example, an encoder may register for a current live presentation, and then send a "presentation over" message to the server 106 when the presentation has completed. Upon receipt of the "presentation over" message, database controller 216 deletes the entry corresponding to the presentation from database 112.

In one implementation of the invention, database controller 216 also includes a timeout control that monitors the length of time that entries have been in database 112. If a "presentation over" message is not received for a live presentation within a default period of time, then controller 216 assumes that a "presentation over" message was mistakenly not sent (or was lost in transit) and removes the entry corresponding to the live presentation from database 112.

Additionally, in another implementation of the invention a presentation that is scheduled for a particular duration (e.g., 90 minutes, or from 2:00 p.m. to 4:00 p.m.) may be extended. The duration can be extended by the encoder 104 (or other device) sending a message to server 106 to change the duration in the corresponding entry of database 112. For example, the message may indicate to change "90 minutes" to "110 minutes", or to change "2:00 p.m. to 4:00 p.m." to "2:00 p.m. to 5:00 p.m.". Alternatively, the duration may be extended by the encoder 104 (or other device) sending a message to server 106 indicating that server 106 is to ignore the previously identified duration and that a "presentation over" message or similar indicator will be transmitted to server 106 when the presentation is over.

The descriptive information field 238 of an entry includes data that describes the content of the corresponding presentation. In the illustrated example of FIG. 4, the data includes a set of one or more key words describing the presentation. Alternatively, the data could include a summary or abstract of the presentation, or a textual transcript of the presentation.

The data for descriptive information field 238 can be generated manually or automatically. Manual generation refers to an individual (e.g., the presentation author) creating the data. For example, the author may write a summary or a list of key words for the presentation and provide them to server 106 (either directly or via an encoder 104).

Automatic generation refers to one of the components, such as an encoder 104 or server 106, using any of a variety of mechanisms to generate data describing the presentation as the presentation occurs. For example, conventional key word generation processes may be employed to identify key words from the presentation. This may be carried out by an encoder 104, server 106, or some other component coupled to network 108. By way of another example, closed captioning information may be used as the data, or conventional speech-to-text conversion techniques may be used to convert audio data into text data.

The information maintained in content database 112 is used by search engine 214 to respond to search requests received from users of a client computer 102 (FIG. 1). A user provides, as part of his or her search request, a set of search criteria and which fields the search criteria should be applied to. The user can provide search requests via any of a wide variety of conventional input mechanisms, such as a graphical user interface (GUI). In the illustrated example, the user is able to search any of the fields in content database 214. Search engine 214 compares the user-provided search criteria to each entry in the database 112 to determine whether the presentation corresponding to the entry satisfies the search request. Any of a variety of conventional searching algorithms and methodologies can be used. For example, any entry with at least one word matching one of the search criteria may satisfy the search request, an entry may be required to include every word in the search criteria in order to satisfy the search request, etc.

Information regarding presentations that satisfy a search request are provided to the client computer 102 of the user that placed the request. Such information may be the entire entry from database 112, or alternatively a selected portion (e.g., the title field 230 and source field 232 for the entry). The source field 232 is provided to the client computer to allow the user to subsequently request the presentation, via the client computer, from the appropriate encoder 104. In the illustrated example, the data in source field 232 comprises a uniform resource locator (URL) that identifies a particular presentation available from a particular encoder.

Information from each entry that satisfies the search criteria is provided to the user and, if multiple entries satisfy the each criteria, then the user can select one or more presentations based on this information. Alternatively, server 106 may rank the entries based on how well they match the search criteria and return information for only the highest ranking entry (or entries) to the user.

In addition to information describing the overall content of the presentation, current "characteristic" information is also (optionally) included in database 112. Characteristic information describing one or more current characteristics of the presentation is registered with search server 106 by the encoder 104. When one or more of the current characteristics changes, the encoder 104 registers the new current characteristic(s) with server 106. Server 106, in response, changes the entry in content database 112 corresponding to the presentation to identify the new current characteristics (e.g., by replacing one or more of the current characteristics or by adding a new characteristic(s)). By continually updating the current characteristics, a user can search for particular characteristics without regard for which actual presentation includes the characteristics. For example, a user may be interested in discussions of Microsoft Corporation and can search for the characteristics "Microsoft" or "Bill Gates" across multiple presentations registered with server 106.

A current characteristic has a duration analogous to that of the presentation discussed above. Each characteristic may have its own duration, or multiple characters for a presentation may have the same duration. The duration of the characteristics can be identified explicitly (e.g., the author may indicate that Microsoft Corporation will be discussed from 2:07 p.m. to 2:12 p.m., or that the current characteristic of Microsoft Corporation will be accurate for the next seven minutes, or a "characteristic over" indicator (such as a "cancel characteristic" message) may be transmitted to server 106 from encoder 104). Alternatively, the duration of the characteristics can be identified implicitly (e.g., the previous current characteristics are over when new current characteristics information is received).

Current characteristics data can also be generated either manually or automatically, analogous to the generation of data for descriptive information field 238 discussed above. For example, an algorithm may use closed captioning data or a speech-to-text conversion algorithm to obtain a textual version of the presentation. Key words can then be identified from the textual version and if their frequency is high enough (e.g., the word "Microsoft" occurs at least a threshold number of times, such as ten, within a period of time, such as sixty seconds or every 500 words), then those key words are identified as the current topic data.

Current characteristics information can be deleted from database 112 in an immediate manner. That is, as soon as new current characteristics data is received, the previous current characteristics data is deleted. Alternatively, the current characteristic information may be "aged out" of database 112 gradually. For example, if new current characteristics are identified and the key words that caused the identification of the previous current characteristics are not detected within a threshold amount of time (e.g., ten minutes), then the previous current characteristics are deleted from database 112. This aging out can be implemented by server 106, or alternatively can be used by encoder 104 in determining when to transmit a "characteristic over" indicator to server 106.

Thus, using characteristics, it can be seen that the results of a search request can vary depending on when during the presentation the search request is made.

Alternatively, the current characteristics for a presentation can be displayed to the user rather than used for searching. For example, a user may submit a search request that results in multiple live presentations with descriptive information 238 satisfying the search criteria. Search server 106 transmits the current characteristics for each of these matching live presentations (as well as other information, such as title 230) to client 102 for display to the user. Search server 106 also transmits any changes in the current characteristics for these matching live presentations to client 102. Thus, client 102 presents to the user a continually updating display of the current characteristics of the live presentations that satisfy his or her search request.

Database controller 216 also maintains notification database 114. A user can register a "notification request" with server 106 that includes a search request and a notification type. The search request includes the user's search criteria and the notification type identifies how the user wants to be notified in the event a live presentation begins that matches the search criteria. In one implementation, a user can register an email address, a pager number, a cellular phone (or other telephone) number, etc.

Database controller 216 receives the notification request and places the search criteria and notification type in notification database 114. Database controller 216 also invokes search engine 214 to determine whether any current entry in content database 112 satisfies the search criteria. If a match is found, then the user is notified in a manner according to the notification type. The notification request may then be removed from notification database 114, or alternatively left in notification database 114 to detect subsequent matches.

If a match is not immediately found, then database controller 216 continues to invoke search engine 214 each time new information is placed in content database 112.

Once invoked, search engine 214 determines whether the new information results in an entry that matches any of the search criteria of notification requests in notification database 114. This search may be compared to all entries in content database 112, or alternatively only to the entries in database 112 that include the new information.

Figure 5:
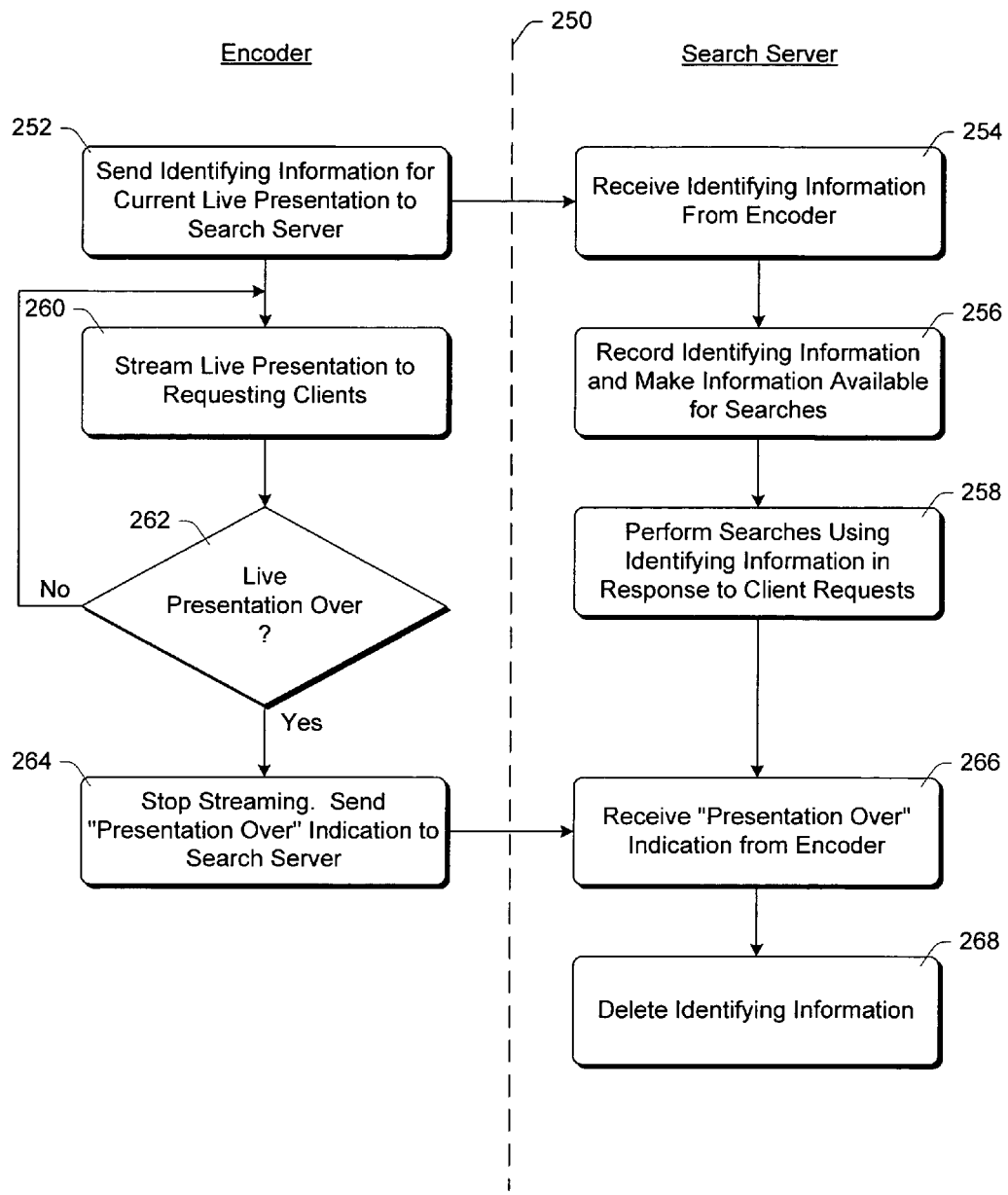
FIG. 5 shows exemplary steps in a process for allowing searching of live presentations.

FIG. 5 shows exemplary steps in a process for allowing searching of live presentations. Steps on the left side of dashed line 250 are carried out by an encoder 104 of FIG. 1, and steps on the right side of dashed line 250 are carried out by search server 106 of FIG. 1. These steps may be performed in software. FIG. 5 is described with additional reference to components in FIG. 1.

Initially, encoder 104 sends identifying information for a current live presentation to search server 106 (step 252). This identifying information is received by server 106 (step 254), which records the information and makes the information available for user searches (step 256). The identifying information is used by server 106 in responding to any subsequent search requests it receives (step 258).

While server 106 is performing steps 254-258, encoder 104 continues to stream the live presentation to any of the client computers 102 that request it until the presentation is over (steps 260 and 262). When the presentation is over, encoder 104 stops streaming the presentation to client computers 102 and sends a "presentation over" indication to server 106 (step 264).

Server 106 receives the "presentation over" indication from encoder 104 (step 266) and deletes its record of the identifying information regarding the presentation (step 268). Thus, any subsequent search requests will not be compared to the identifying information for that presentation, as that presentation is over.

Alternatively, rather than relying on a "presentation over" indication in step 266, server 106 may be informed of the end of the presentation in other manners (such as a preprogrammed duration).

Figure 6:
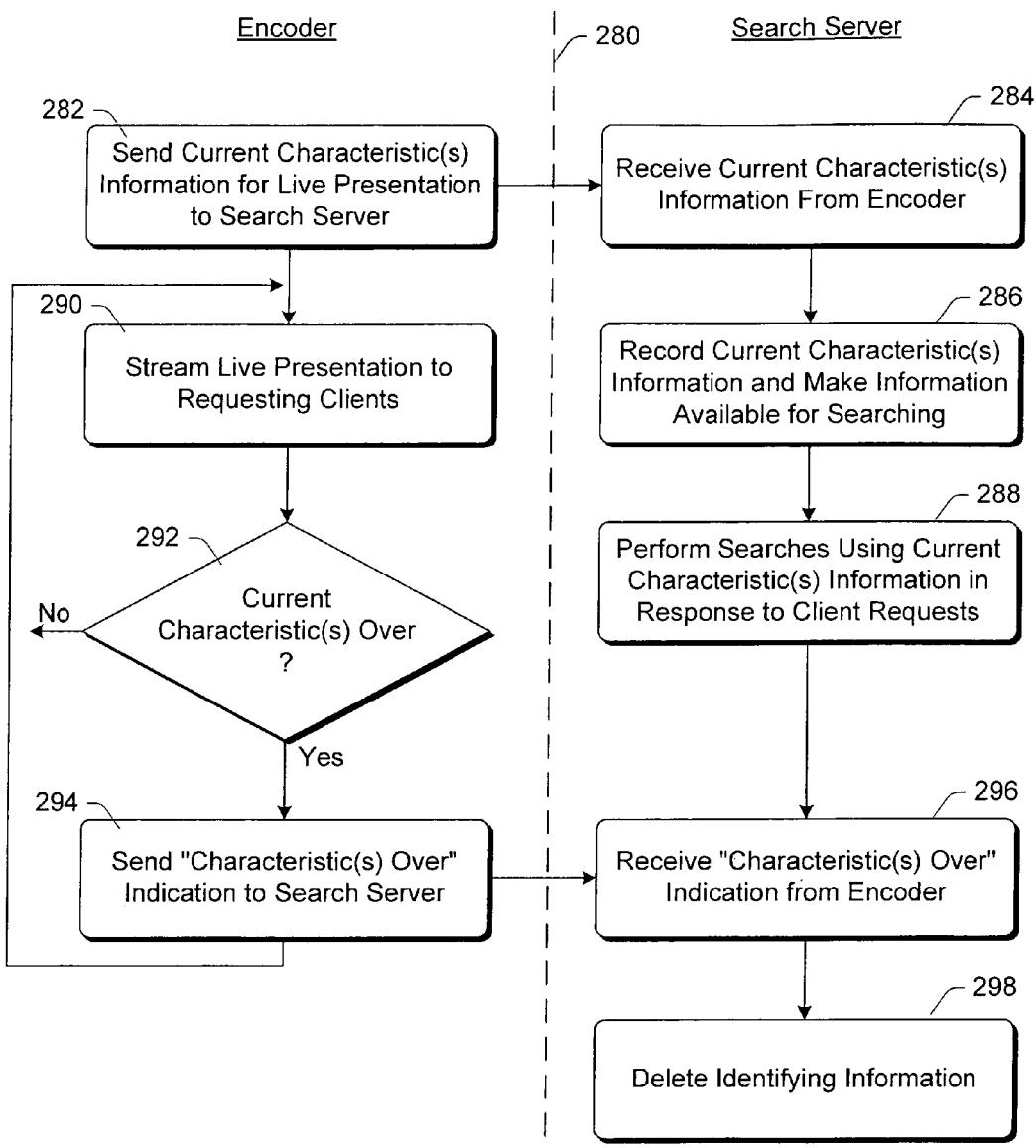
FIG. 6 shows exemplary steps in a process for allowing searching of current characteristics information in live presentations.

FIG. 6 shows exemplary steps in a process for allowing searching of current characteristic information in live presentations. Steps on the left side of dashed line 280 are carried out by an encoder 104 of FIG. 1, and steps on the right side of dashed line 280 are carried out by search server 106 of FIG. 1. These steps may be performed in software. FIG. 6 is described with additional reference to components in FIG. 1.

Initially encoder 104 sends, to search server 106, current characteristic(s) information for the portion of a live presentation currently being presented (step 282). Search server 106 in turn receives the current characteristic(s) information (step 284). Server 106 records the current characteristic(s) information and makes the information available for searching (step 286). The characteristic(s) information is used by server 106 in responding to any subsequent search requests it receives (step 288).

While server 106 is performing steps 284-288, encoder 104 continues to stream the live presentation to any of the client computers 102 that request it (step 290). Encoder 104 also checks whether the current characteristic(s) are over (step 292). When the current characteristic(s) are over (e.g., they no longer describe the portion of the live presentation currently being presented), encoder 104 sends a "characteristic(s) over" indication to server 106 (step 294).

Server 106 receives the characteristic(s) over indication from encoder 104 (step 296) and deletes its record of the characteristic(s) information (step 298). Thus, any subsequent search requests will not be compared to the characteristic(s) information for that presentation, as those characteristic(s) are over.

Conclusion

The invention allows for the searching of live presentations. An encoder providing a live presentation registers with a search server, advantageously making information identifying the presentation available for searching only for the duration of the presentation. Additionally, characteristic information identifying current characteristic(s) of the presentation can be registered with the search server only for the duration of that characteristic(s). Thus, the characteristic information is advantageously made available for only as long as that characteristic(s) describes the current portion of the live presentation.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. An article of manufacture comprising computer-readable media embodying computer-readable instructions thereon configured to cause one or more processors to perform acts of:

receiving information identifying a live presentation;

making the information available for searching only for a duration of the live presentation;

receiving information identifying a current characteristic of the live presentation, wherein the receiving comprises receiving information identifying a live presentation scheduled to occur in the future; and making the current characteristic available for searching for as long as the current characteristic describes a currently presenting portion of the live presentation, wherein the making the current characteristic available for searching comprises:

adding the information identifying the current characteristic to a database of currently available live presentations;

deleting the information identifying the current characteristic from the database when the characteristic no longer describes the currently presenting portion of the live presentation;

receiving a user search request; and checking the database of currently available live presentations to determine, based at least in part on the current characteristic in the database, whether a currently available live presentation matches the user search request.

2. An article of manufacture as recited in claim 1, wherein the computer-readable code further comprises computer-readable code configured to cause the one or more processors to perform acts including:

receiving information identifying a plurality of live presentations; and for each live presentation, making the information identifying the live presentation available for searching only during a duration of the live presentation.

3. An article of manufacture as recited in claim 1, wherein the computer-readable code further comprises computer-readable code configured to cause the one or more processors to perform acts including:

receiving information identifying a plurality of live presentations;

for each live presentation, making the information identifying the live presentation available for searching only for the duration of the live presentation;

maintaining a record of user search requests; and notifying the corresponding user when a new live presentation that satisfies a search request is available.

4. An article of manufacture as recited in claim 1, wherein the computer-readable code further comprises computer-readable code configured to cause the one or more processors to perform acts including:

receiving information identifying a plurality of live presentations;

for each live presentation, making the information identifying the live presentation available for searching only for the duration of the live presentation;

maintaining a record of user search requests;

notifying the corresponding user when a new live presentation that satisfies a search request is available;

receiving, for each of the user search requests, an indication of how the user should be notified; and notifying the user in accordance with the notification.

5. An article of manufacture as recited in claim 1, wherein the computer-readable code configured to cause the one or more processors to perform acts including receiving comprises computer-readable code configured to cause the one or more processors to perform acts including receiving the information from a same encoder as is presenting the information.

6. An article of manufacture as recited in claim 1, wherein the computer-readable code configured to cause the one or more processors to perform acts including making the information available for searching comprises computer-readable code configured to cause the one or more processors to perform acts including:

adding the information to a database of currently available live presentations; and deleting the information from the database when the live presentation has ended.

7. An article of manufacture as recited in claim 1, wherein the computer-readable code configured to cause the one or more processors to perform acts including making the information available for searching comprises computer-readable code configured to cause the one or more processors to perform acts including:

adding the information to a database of currently available live presentations;

deleting the information from the database when the live presentation has ended;

receiving a user search request; and accessing the database of currently available live presentations to determine whether a currently available live presentation matches the user search request.

8. An article of manufacture as recited in claim 1, further comprising computer-readable code configured to cause the one or more processors to perform acts including receiving an indication, from an encoder that is presenting the information, that the live presentation is finished.

9. An article of manufacture as recited in claim 1, further comprising computer-readable code configured to cause the one or more processors to perform acts including:

receiving information identifying a current characteristic of the live presentation; and making the current characteristic available for searching for as long as the current characteristic describes a currently presenting portion of the live presentation.

10. An article of manufacture as recited in claim 1, further comprising computer-readable code configured to cause the one or more processors to perform acts including:
   maintaining a record of user search requests; and
   alerting a corresponding user when a new current characteristic that satisfies a search request describes the currently presenting portion of the live presentation.

11. An article of manufacture as recited in claim 1, further comprising computer-readable code configured to cause the one or more processors to perform acts including:
   receiving information identifying a current characteristic of the live presentation; and
   transmitting the information identifying the current characteristic of the live presentation to a client computer.

12. An article of manufacture as recited in claim 1, further comprising computer-readable code configured to cause the one or more processors to perform acts including:
   generating, based at least in part on the information identifying the live presentation, descriptive information corresponding to the live presentation; and
   adding the descriptive information to a database of currently available live presentations.

13. An article of manufacture as recited in claim 1, wherein the computer-readable code configured to cause the one or more processors to perform acts including receiving information identifying a live presentation comprises computer-readable code configured to cause the one or more processors to perform acts including receiving information identifying a live presentation, wherein the live presentation includes an audio stream and a video stream.

14. A system comprising:
   one or more processors;
   a memory coupled to the one or more processors;
   first means for receiving, the first receiving means for receiving information identifying a live presentation;
   first means for making, the first making means for making the information available configured to make the information available for searching only for a duration of the live presentation;
   second means for receiving, the second receiving means for receiving information identifying a current characteristic of the live presentation, wherein the second receiving means is configured for receiving information identifying a live presentation scheduled to occur in the future; and
   second means for making, the second making means for making the current characteristic available and configured to make the current characteristic available for searching for as long as the current characteristic describes a currently presenting portion of the live presentation, wherein second making means further comprises an apparatus configured for:
   adding the information identifying the current characteristic to a database of currently available live presentations;
   deleting the information identifying the current characteristic from the database when the characteristic no longer describes the currently presenting portion of the live presentation;
   receiving a user search request; and
   checking the database of currently available live presentations to determine, based at least in part on the current characteristic in the database, whether a currently available live presentation matches the user search request.

15. A system as recited in claim 14, further comprising:
   third receiving means for receiving information identifying a plurality of live presentations; and
   third making means for making the information identifying the live presentation available for searching for each live presentation only during a duration of the respective live presentation.

16. A system as recited in claim 14, further comprising:
   third means for receiving, for receiving information identifying a plurality of live presentations; and
   third making means for making the information identifying the live presentation available for searching for each live presentation only during a duration of the respective live presentation,
   means for maintaining a record of user search requests for each user corresponding to the user search requests; and
   means for notifying the corresponding user when a new live presentation that satisfies a search request is available.

17. A system as recited in claim 14, further comprising:
   third receiving means, for receiving information identifying a plurality of live presentations;
   third means for making the information identifying the live presentation available for searching for each live presentation only for the duration of the live presentation;
   means for maintaining a record of user search requests;
   means for notifying the corresponding user when a new live presentation that satisfies a search request is available;
   fourth means for receiving, for each of the user search requests, an indication of how the user should be notified; and
   means for notifying the user in accordance with the notification.

18. A system as recited in claim 14, wherein the first receiving means is configured to receive the information from a same encoder as is presenting the information.

19. A system as recited in claim 14, further comprising:
   means for adding the information to a database of currently available live presentations; and
   means for deleting the information from the database when the live presentation has ended.

20. A system as recited in claim 14, further comprising:
   means for adding the information to a database of currently available live presentations;
   means for deleting the information from the database when the live presentation has ended;
   third means for receiving, for receiving a user search request; and
   means for accessing the database of currently available live presentations to determine whether a currently available live presentation matches the user search request.

21. A system as recited in claim 14, further comprising means for receiving an indication, from an encoder that is presenting the information, that the live presentation is finished.

22. A system as recited in claim 14, further comprising:
   third means for receiving, for receiving information identifying a current characteristic of the live presentation; and
   third means for making the current characteristic available for searching for as long as the current characteristic describes a currently presenting portion of the live presentation.

23. A system as recited in claim 14, further comprising:
   means for maintaining a record of user search requests; and means for alerting a corresponding user when a new current characteristic that satisfies a search request describes the currently presenting portion of the live presentation.

24. A system as recited in claim 14, further comprising:
third means for receiving, for receiving information identifying a current characteristic of the live presentation; and
means for transmitting the information identifying the current characteristic of the live presentation to a client computer.

25. A system as recited in claim 14, further comprising:
means for generating, based at least in part on the information identifying the live presentation, descriptive information corresponding to the live presentation; and
means for adding the descriptive information to a database of currently available live presentations.

26. A system as recited in claim 14, further comprising third means for receiving for receiving information identifying a live presentation, wherein the live presentation includes an audio stream and a video stream.

27. An article of manufacture comprising computer-readable media embodying computer-readable instructions thereon configured to cause one or more processors to perform acts of:
making information identifying a live presentation available for searching only for a duration of the live presentation;
receiving information identifying a current characteristic of the live presentation; and
making the current characteristic available for searching for as long as the current characteristic describes a currently presenting portion of the live presentation, wherein the making the current characteristic available for searching comprises:
adding the information identifying the current characteristic to a database of currently available live presentations; and
deleting the information identifying the current characteristic from the database when the characteristic no longer describes the currently presenting portion of the live presentation, and further comprising:
receiving a user search request; and
checking the database of currently available live presentations to determine, based at least in part on the current characteristic in the database, whether a currently available live presentation matches the user search request.

28. An article of manufacture as recited in claim 27, further comprising computer-readable code configured to cause the one or more processors to perform acts including receiving information identifying a live presentation scheduled to occur in the future.

29. An article of manufacture as recited in claim 27, further comprising computer-readable code configured to cause the one or more processors to perform acts including receiving information identifying a currently available live presentation.

30. An article of manufacture as recited in claim 27, further comprising computer-readable code configured to cause the one or more processors to perform acts including:
receiving information identifying a plurality of live presentations; and
for each live presentation, making the information identifying the live presentation available for searching only during a duration of the live presentation.

31. An article of manufacture as recited in claim 27, further comprising computer-readable code configured to cause the one or more processors to perform acts including:
receiving information identifying a plurality of live presentations;
for each live presentation, making the information identifying the live presentation available for searching only for the duration of the live presentation;
maintaining a record of user search requests; and
notifying the corresponding user when a new live presentation that satisfies a search request is available.

32. An article of manufacture as recited in claim 27, further comprising computer-readable code configured to cause the one or more processors to perform acts including:
receiving information identifying a plurality of live presentations;
for each live presentation, making the information identifying the live presentation available for searching only for the duration of the live presentation;
maintaining a record of user search requests;
notifying the corresponding user when a new live presentation that satisfies a search request is available;
receiving, for each of the user search requests, an indication of how the user should be notified; and
notifying the user in accordance with the notification.

33. An article of manufacture as recited in claim 27, further comprising computer-readable code configured to cause the one or more processors to perform acts including receiving information describing a live presentation from a same encoder as is presenting the information.

34. An article of manufacture as recited in claim 27, further comprising computer-readable code configured to cause the one or more processors to perform acts including:
receiving a user search request; and
accessing the database of currently available live presentations to determine whether a currently available live presentation matches the user search request.

35. An article of manufacture as recited in claim 27, further comprising computer-readable code configured to cause the one or more processors to perform acts including receiving an indication, from an encoder that is presenting the information describing the live presentation, that the live presentation is finished.

36. An article of manufacture as recited in claim 27, further comprising computer-readable code configured to cause the one or more processors to perform acts including:
receiving information identifying a current characteristic of the live presentation; and
making the current characteristic available for searching for as long as the current characteristic describes a currently presenting portion of the live presentation.

37. An article of manufacture as recited in claim 27, further comprising computer-readable code configured to cause the one or more processors to perform acts including:
receiving information identifying a current characteristic of the live presentation; and
making the current characteristic available for searching for as long as the current characteristic describes a currently presenting portion of the live presentation, and further comprising:
maintaining a record of user search requests; and
alerting a corresponding user when a new current characteristic that satisfies a search request describes the currently presenting portion of the live presentation.

38. An article of manufacture as recited in claim 27, further comprising computer-readable code configured to cause the one or more processors to perform acts including:
 receiving information identifying a current characteristic of the live presentation; and
 transmitting the information identifying the current characteristic of the live presentation to a client computer.

39. An article of manufacture as recited in claim 27, further comprising computer-readable code configured to cause the one or more processors to perform acts including:
 generating, based at least in part on the information identifying the live presentation, descriptive information corresponding to the live presentation; and
 adding the descriptive information to a database of currently available live presentations.

40. An article of manufacture as recited in claim 27, wherein the live presentation includes an audio stream and a video stream.

41. An article of manufacture as recited in claim 27, further comprising computer-readable code configured to cause the one or more processors to perform acts including:
 receiving, for each of the user search requests, an indication of how the user should be notified chosen from a group consisting of: an email address, a pager number, a phone number and a cellular phone number; and
 notifying the user in accordance with the notification.

* * * * *